United States Patent [19]

Ban

[11] Patent Number: 5,468,350
[45] Date of Patent: Nov. 21, 1995

[54] APPARATUS FOR MANUFACTURING ULTRAPURE WATER

[75] Inventor: Cozy Ban, Hyogo, Japan

[73] Assignee: Mitsubishi Denki Kabushiki Kaisha, Tokyo, Japan

[21] Appl. No.: 91,580

[22] Filed: Jul. 15, 1993

[30] Foreign Application Priority Data

Oct. 21, 1992 [JP] Japan ..................... 4-282703

[51] Int. Cl.⁶ .................... C02F 1/04; C02F 1/32
[52] U.S. Cl. ............... 202/176; 202/202; 159/DIG. 6; 203/3; 203/10; 203/31; 203/38; 203/41; 203/DIG. 16; 210/748; 210/758; 210/759; 210/760; 210/900
[58] Field of Search ................... 202/176, 202; 203/10, 11, 3, 31, 99, 38, 41, DIG. 1, DIG. 16; 159/DIG. 6, DIG. 26; 210/748, 760, 758, 759, 764, 900

[56] References Cited

U.S. PATENT DOCUMENTS

| | | | |
|---|---|---|---|
| 3,127,243 | 3/1964 | Konikoff | 203/31 |
| 3,248,306 | 4/1966 | Cummings | 159/DIG. 6 |
| 3,257,291 | 6/1966 | Gerber | 203/DIG. 1 |
| 3,276,458 | 10/1966 | Iversen et al. | 210/900 |
| 3,487,016 | 12/1969 | Zeff | 203/31 |
| 3,775,257 | 11/1973 | Lovrich | 202/202 |
| 4,276,256 | 6/1981 | Karamian | 202/202 |
| 4,595,498 | 6/1986 | Cohen . | |
| 4,640,769 | 2/1987 | Wemhoff | 203/31 |
| 4,787,980 | 11/1988 | Ackermann . | |
| 4,792,407 | 12/1988 | Zeff . | |
| 4,953,694 | 9/1990 | Hayashi et al. | 202/180 |
| 5,073,268 | 12/1991 | Saito . | |
| 5,118,422 | 6/1992 | Cooper . | |
| 5,120,450 | 6/1992 | Stanley | 210/748 |
| 5,141,717 | 8/1992 | McRae . | |
| 5,234,606 | 8/1993 | Kazama et al. | 210/748 |
| 5,246,586 | 9/1993 | Ban . | |
| 5,272,091 | 12/1993 | Egozy . | |

FOREIGN PATENT DOCUMENTS

| | | | |
|---|---|---|---|
| 0254519 | 1/1988 | European Pat. Off. . | |
| 149799 | 7/1981 | Germany . | |
| 52-75664 | 6/1977 | Japan | 203/31 |
| 2-293083 | 12/1990 | Japan . | |

OTHER PUBLICATIONS

IWL—Forum 19 (1982)3, pp. 83 to 97 (in German).
Jay E. Taylor, "An Apparatus for the Continuous Production of Triple Distilled Water," Journal of Chemical Education, vol. 37, No. 4 (1960), pp. 204 and 205.
Von Kurt Meuli, "Reinstwasser fur Spitzentechnologien," Tecjmoscje Rimdscjai. 42/87, pp. 62 to 66. No Date.
Kenneth Hickman et al., "A Distilling System for Purer Water," Science, Apr. 6, 1973, vol. 180, No. 4081, pp. 15 to 25.
"The Preparation of Pure Water and Ultra Pure Water," Mar. 20, 1985, pp. 40–49.

Primary Examiner—Wilbur Bascomb, Jr.
Attorney, Agent, or Firm—Lowe, Price, LeBlanc & Becker

[57] ABSTRACT

The apparatus includes a container for accommodating water to be treated and evaporating the water. Container is attached with water supply for supplying the water to be treated into the container. The water to be treated in container is heated by a heater. Vapor evaporated from the inside of container is cooled by a cooler. Distilled water output from cooler is irradiated with ultraviolet light by a ultraviolet light irradiator. An organic decomposed substance contained in the distilled water irradiated with the ultraviolet light is removed by organic decomposed substance removal device, and ultrapure water is obtained.

6 Claims, 5 Drawing Sheets

5,468,350

APPARATUS FOR MANUFACTURING ULTRAPURE WATER

BACKGROUND OF THE INVENTION

1. Field of the Invention

The present invention relates generally to methods of manufacturing ultrapure water, and more specifically, to a method of manufacturing ultrapure water so improved that an organic substance having a boiling point lower than water does not remain. The invention further relates to an apparatus for manufacturing such ultrapure water.

2. Description of the Background Art

In recent years, for ultrapure water for use in the field of electronics or medication, water with a higher purity is in demand with technological development in the field. Particularly for water for washing semiconductor wafers, water with an even higher purity than conventional ultrapure water, in other words water including few constituents other than water is required as the integration density of integrated circuits increases.

FIG. 8 is a view showing the concept of a ultrapure water manufacturing apparatus utilizing distillation, which has been conventionally utilized. The conventional pure water manufacturing apparatus includes an evaporation container 2 for accommodating primary water to be treated and evaporating the water. Evaporation container 2 is provided on a heater 3. A cooler 4 is provided on evaporation container 2. A distilled water inlet tube 5 is connected to cooler 4. Evaporation container 2 is provided with a water to be treated (raw water) injection tube 1 for supplying raw water, in other words for supplying primary water to be treated into the evaporation container. The primary water means water produced by condensing and filtering industrial water and then passing the resultant water through ion-exchange resin. The primary water includes organic substances, non-organic substances, charged fine particles, impurities such as alcohol or the like, e.g. methanol, ethanol, butanol, and octanol.

Such an apparatus used to use silica glass for its part in contact with liquid (water to be treated) conventionally, but use of silica glass is disadvantageous, because silica will be contained in distilled water. Therefore, all the part in contact with liquid is formed of stainless steel. Further, recently, an apparatus is utilized in which its part of stainless steel is polished in an electrolytic manner to increase its specific resistance to 18MΩ·cm, in order to restrict impurities such as metallic ions from dissolving.

Now, an operation will be described. Raw water to be treated is introduced into evaporation container 2 through water injection tube 1. The crude water introduced into evaporation container 2 is heated by heater 3 to boil. Evaporated water is cooled in cooler 4 to be distilled water, and evacuated externally through a ultrapure water supply tube 5 and led to a use point.

The conventional ultrapure water manufacturing apparatus utilizing distillation having the structure described above can remove non-volatile impurities such as silica and volatile impurities having a boiling point higher than water.

However, it can not remove volatile impurities having a boiling point lower than water and is encountered with a disadvantage that organic substances having a low boiling point remain in the produced ultrapure water.

SUMMARY OF THE INVENTION

It is therefore one object of the invention to provide an improved method of manufacturing ultrapure water so that an organic substance having a boiling point lower than water does not remain.

Another object of the invention is to provide an improved method of manufacturing ultrapure water so that an organic substance having a low boiling point can be removed as well as other volatile and non-volatile impurities having a high boiling point can be removed.

Yet another object of the invention is to provide an improved method of manufacturing ultrapure water permitting ultrapure water close to theoretical pure water to be obtained.

A still further object of the invention is to provide an apparatus for manufacturing ultrapure water for providing such ultrapure water described above.

An additional object of the invention is to provide an improved apparatus for manufacturing ultrapure water permitting removal of an organic impurity having a low boiling point and reduction of the size of the apparatus.

In a method of manufacturing ultrapure water according to a first aspect of the invention, water to be treated is prepared first. The water to be treated is distillated to obtain distilled water. The distilled water is irradiated with ultraviolet light and organic impurities contained in the distilled water is decomposed by oxidation. The organic decomposed substances contained in the above-described distilled water irradiated with the ultraviolet light are removed away, and ultrapure water is provided as a result.

According to a preferred embodiment of the invention, TOC in the resultant ultrapure water is detected, and the above-described decomposition by oxidation is performed while adjusting the intensity of the ultraviolet light so that the TOC is lower than a set value.

In a method of manufacturing ultrapure water according to a second aspect of the invention, water to be treated is prepared. An oxidizing agent is injected in the water to be treated. The water to be treated is heated and distilled to decompose an organic impurity in the water, and distilled water is obtained as a result. The organic decomposed substances contained in the distilled water are removed away, and ultrapure water is thus provided.

According to a preferred embodiment of the invention, the above-described oxidizing agent is selected from a group consisting of $H_2O_2$, $O_2$ and O-radical.

In a method of manufacturing ultrapure water according to a third aspect of the invention, water to be treated is prepared first. The water to be treated is heated for distillation in an atmosphere of $O_2$, $O_3$ or O-radicals, an organic impurity contained in the water to be treated is decomposed, and distilled water is obtained as a result. Removal of the organic decomposed substances in the distilled water provides ultrapure water.

An apparatus for manufacturing ultrapure water according to a fourth aspect of the invention includes a container for accommodating and evaporating water to be treated. The container is attached with water supplying means for supplying the water to be treated into the container. The apparatus includes heating means for heating the water to be treated, thereby evaporating the water. The apparatus also includes cooling means for cooling vapor of the water evaporated from the container and converting the vapor into distilled water. The apparatus further includes ultraviolet light irradiation means for irradiating the distilled water output from the cooling means with ultraviolet light, thereby decomposing an organic impurity contained in the distilled water. The apparatus further includes organic decomposed substances removal means for removing the organic decomposed substances contained in the distilled water irradiated with the ultraviolet light.

An apparatus for manufacturing ultrapure water according to a fifth aspect of the invention includes a container for accommodating and evaporating water to be treated. The container is attached with water supplying means for supplying water to be treated into the container. The apparatus includes oxidizing agent introduction means for introducing an oxidation agent into the water to be treated. The apparatus further includes heating means for heating the water in the container, thereby evaporating the water, and cooling means for cooling vapor of the water to be treated evaporated from the container, thereby converting the vapor into distilled water. The apparatus further includes organic decomposed substance removal means for removing organic decomposed substances contained in the distilled water output from the cooling means.

An apparatus for manufacturing ultrapure water according to a sixth aspect of the invention includes a container for accommodating and evaporating water to be treated. The container is attached with a water to be treated supplying means for supplying water to be treated into the container. The container is attached with oxidative gas supplying means for supplying $O_2$, $O_3$ or O-radical into the space which is not filled with water to be treated. The apparatus includes heating means for heating the water to be treated in the container, thereby evaporating the water to be treated, and cooling means for cooling vapor of the water to be treated evaporated from the container, thereby converting the vapor into distilled water. The apparatus further includes organic decomposed substances removal means for removing organic decomposed substances contained in the distilled water output from the cooling means.

In the method of manufacturing ultrapure water according to the first aspect of the invention, the distilled water is irradiated with the ultraviolet light, and the organic impurity contained in the distilled water is thus decomposed by oxidation. By this oxidation decomposition, an impurity (organic substance) having a low boiling point contained in the distilled water decomposes into organic acid, carbonic acid, carbonic acid gas and $H_2O$. Then, these organic decomposed substances are removed away. According to the method, impurities with a low boiling point can effectively be removed away.

In the method of manufacturing ultrapure water according to the second aspect of the invention, the water to be treated injected with the oxidizing agent is heated for distillation. At the time of heating distillation, an impurity (organic substance) having a low boiling point contained in the water to be treated decomposes into organic acid, carbonic acid, carbonic acid gas and $H_2O$.

In the method of manufacturing ultrapure water according to the third aspect of the invention, the water to be treated is heated for distillation in an atmosphere of $O_2$, $O_3$, or O-radicals. At the time of the heating distillation, an impurity (organic substance) having a low boiling point contained in the water to be treated decomposes into organic acid, carbonic acid, carbonic acid gas and $H_2O$.

In the method of manufacturing ultrapure water according to the fourth aspect of the invention, the distilled water output from the cooling means is irradiated with ultraviolet light. By this irradiation of ultraviolet light, an impurity (organic substance) having a low boiling point contained in the distilled water decomposes into organic acid, carbonic acid, carbonic acid gas and $H_2O$. Then, these organic decomposed substances are removed away. The apparatus can effectively remove away impurities with a low boiling point.

By the apparatus according to the fifth aspect of the invention, since the water to be treated injected with the oxidizing agent is distilled, an impurity (organic substance) having a low boiling point contained in the water to be treated decomposes into organic acid, carbonic acid, carbonic acid gas, and $H_2O$ at the time of this heating distillation.

By the apparatus for manufacturing ultrapure water according to the sixth aspect of the invention, since the water to be treated is heated for distillation in an atmosphere of $O_2$, $O_3$, or O-radical, an impurity (organic substance) having a low boiling point contained in the water to be treated decomposes into organic acid, carbonic acid, carbonic acid gas and $H_2O$.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Now, embodiments of the invention will be described in conjunction with the accompanying drawings.

Embodiment 1

Figure 1:
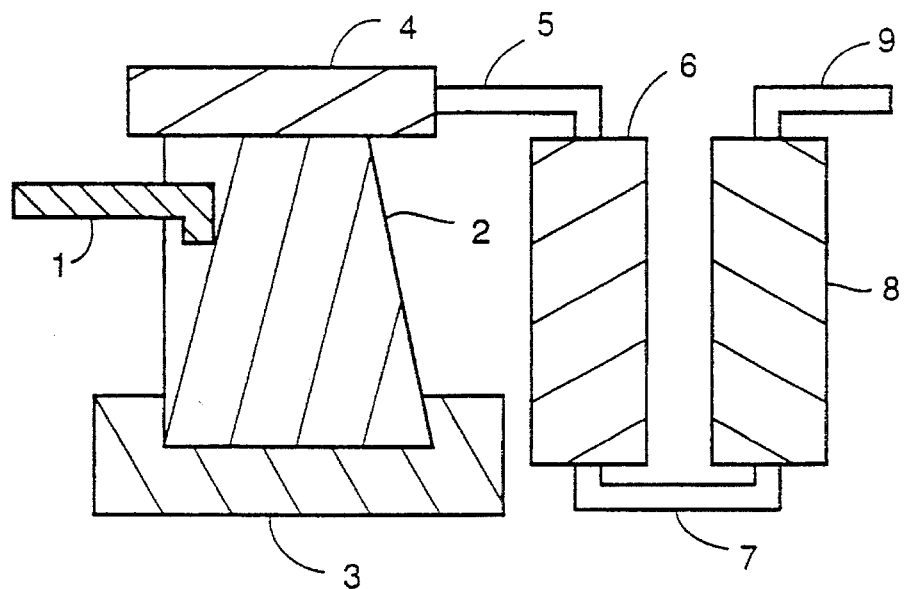
FIG. 1 is a view showing the concept of a ultrapure water manufacturing apparatus according to a first embodiment of the invention.

FIG. 1 illustrates the concept of a ultrapure water manufacturing apparatus according to one embodiment of the invention. The apparatus includes an evaporation container 2. Evaporation container is provided on a heater 3. A cooler 4 is provided on evaporation container 2. One end of a distilled water output tube 5 is connected to cooler 4. The other end of distilled water output tube 5 is connected to ultraviolet light irradiator 6. Ultraviolet irradiator 6 and a polisher 8 are connected by a connecting tube 7. Polisher 8 is provided with ultrapure water supplying tube 9 for supplying ultrapure water to a use point.

Now, an operation of the ultrapure water manufacturing apparatus shown in FIG. 1 will be described. Water to be treated (primary pure water) is injected into evaporation container 2 through a water injection tube 1. The water to be treated injected into evaporation container 2 is heated by heater 3 and evaporates. At that time, non-volatile impurity and non-volatile impurity with a high boiling point remain at the bottom of evaporation container 2. The evaporated vapor is cooled at cooler 4 and becomes distilled water. The distilled water is passed through distilled water output tube 5 and introduced to ultraviolet irradiator 6. The distilled water still includes non-volatile impurity having a low boiling point such as methanol, ethanol, and butanol which has not been removed by the distillation. When irradiated with a ultraviolet light of 187 nm, the organic substance with a low boiling point decomposes into organic acid, carbonic acid, carbonic acid water, and $H_2O$. The water with the low boiling point organic substance decomposed by the irradiation of the ultraviolet light is passed through connecting tube 7 and supplied to polisher 8. All the acid contained in the water is absorbed by ion-exchange resin which fills the inside of the polisher. Accordingly, ultrapure water close to theoretical ultrapure water is output from distilled water supply outlet 9.

It is noted that although the distillation is performed by means of evaporation in the above-described embodiment, the invention is not limited to this method, and distillation may be performed by means of low pressure process.

Embodiment 2

Figure 2:
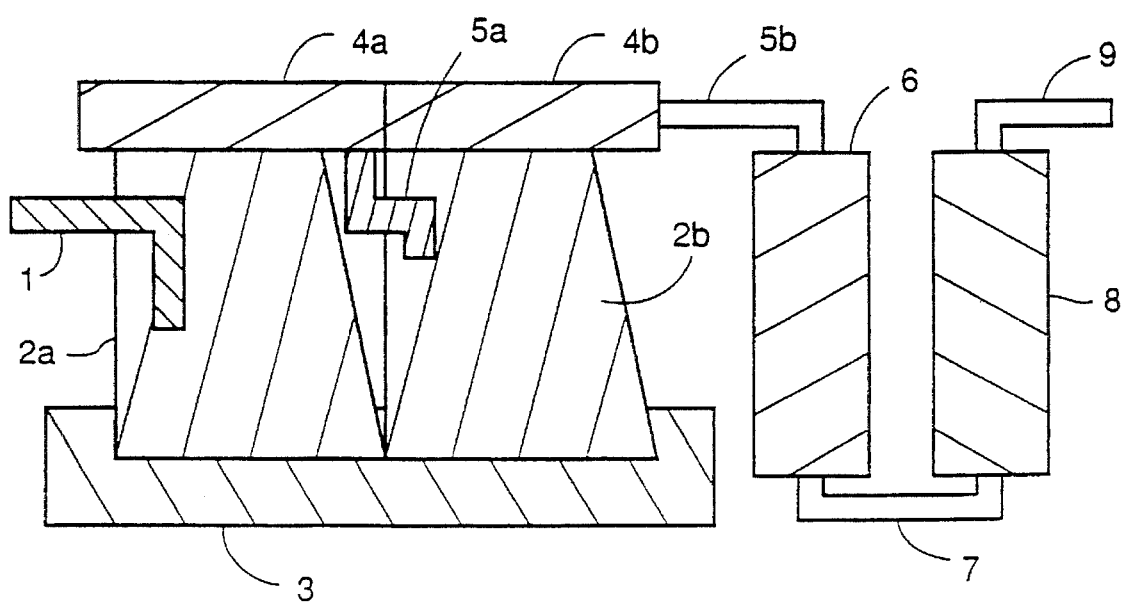
FIG. 2 is a view showing the concept of a ultrapure water manufacturing apparatus according to a second embodiment of the invention.

FIG. 2 is a view showing the concept of an apparatus for manufacturing ultrapure water according to another embodiment of the invention. The apparatus includes evaporation containers 2a and 2b. Evaporation containers 2a and 2b are both provided on a heater 3. A cooler 4a is provided on evaporation container 2a. Cooler 4a and evaporation container 2b are connected by a distilled water output tube 5a. A cooler 4b is provided on evaporation container 2b. One end of a distilled water output tube 5b is connected to cooler 4b. The other end of distilled water output tube 5b is connected to a ultraviolet light irradiator 6. Ultraviolet light irradiator 6 and polisher 8 are connected by a connecting tube 7. Polisher 8 is provided with a ultrapure water supply outlet for supplying ultrapure water to a use point.

The apparatus shown in FIG. 2 is a 2-stage distillation apparatus, but the invention is not limited to this, and the apparatus may be a three or more-stage apparatus. It is noted that in the apparatus, all the part in contact with liquid is formed of electrolytically polished stainless steel.

Now, an operation of the ultrapure water manufacturing apparatus shown in FIG. 2 will be described. Water to be treated (primary pure water) is injected into evaporation container 2a through water injection tube 1. The water to be treated injected into evaporation container 2a is heated by heater 3 and evaporates. At that time, non-volatile impurity and high boiling point non-volatile impurity remain at the bottom of evaporation container 2a. The evaporated vapor is cooled at cooler 4a and becomes primary distilled water. The primary distilled water is passed through distilled water output tube 5a and introduced into the evaporation container 2b of the second stage of distillation apparatus. The water introduced into evaporation container 2b is heated by heater 3 and evaporates. At that time, the non-volatile impurity and high boiling point non-volatile impurity which have not been removed by the first stage of distillation apparatus remain at the bottom of evaporation container 2b. The evaporated vapor is cooled at cooler 4b to be secondary distilled water, is passed through distilled water output tube 5b and introduced to ultraviolet light irradiator 6. The secondary distilled water still includes low boiling point non-volatile impurity such as methanol, ethanol, and butanol which has not been removed by the distillation. When irradiated with a ultraviolet light of 187 nm, the low boiling point organic substance decomposes into organic acid, carbonic acid, carbonic acid water, and $H_2O$. The water with the low boiling point organic substance decomposed by the irradiation of the ultraviolet light is passed through connecting tube 7 and supplied to polisher 8. All the acid contained in the water is absorbed by ion-exchange resin filling the inside of polisher 8. Accordingly, ultrapure water very close to logical ultrapure water is output from a distilled water supply tube 9.

The quality of the pure water obtained utilizing the apparatus shown in FIG. 2 is set forth in Table 1.

TABLE 1

| Specific Ratio | $M\Omega \cdot cm$ | $\supseteq$ 18.00 |
| --- | --- | --- |
| Particles | $\supseteq$ 0.07 μm, ps/ml | $\subseteq$ 2 |
| TOC | ppb | $\subseteq$ 0.5 |
| Dissolved Oxygen | ppb | $\subseteq$ 2 |
| Non-Volatile Residue | ppb | $\subseteq$ 0.1 |
| Silica | ppb | $\subseteq$ 0.00 |
| Metal Ions | ppb | $\subseteq$ 0.00 |

Embodiment 3

Figure 3:
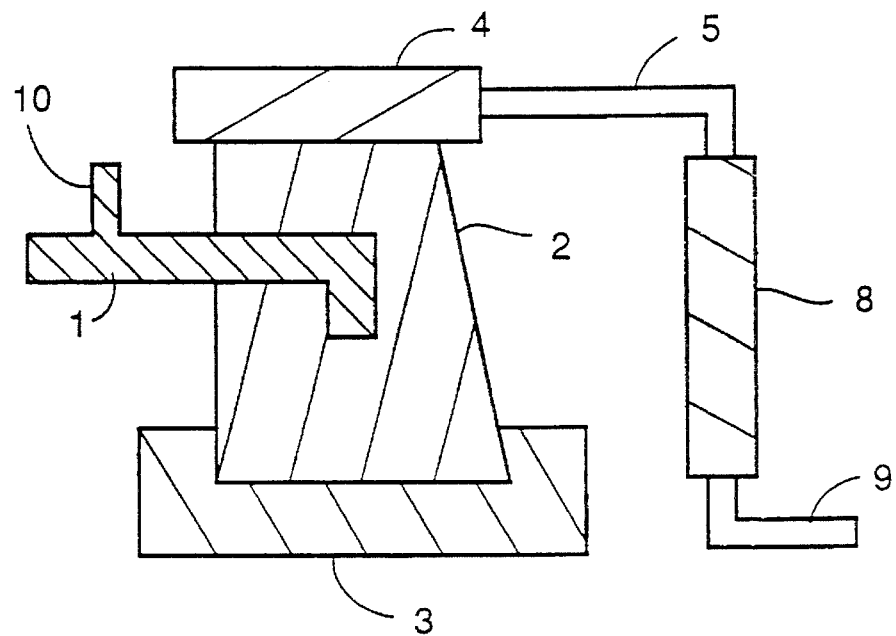
FIG. 3 is a view showing the concept of a ultrapure water manufacturing apparatus according to a third embodiment of the invention.

FIG. 3 is a view showing the concept of an apparatus for manufacturing ultrapure water according to yet another embodiment of the invention. An evaporation container 2 is provided on a heater 3. A cooler 4 is provided on evaporation container 2. Cooler 4 and a polisher 8 are connected by a distilled water output tube 5. Polisher 8 is connected to a ultrapure water supply tube 9 for supplying ultrapure water to a use point. Evaporation container 2 is attached with a water injection tube 1. Water injunction tube 1 is connected to an $H_2O_2$ injection tube 10.

Figure 3A:
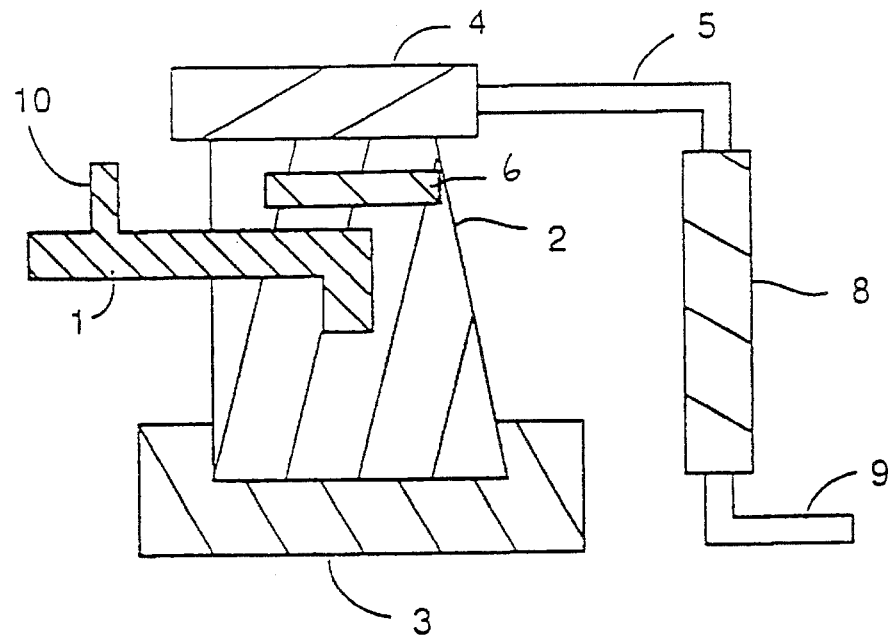
FIG. 3A is a view showing an improved version of the embodiment depicted in FIG. 3.

An operation will be described. $H_2O_2$ is injected into the water to be treated (primary pure water) through an $H_2O_2$ injection tube 10, and introduced into evaporation container 2. The water to be treated containing $H_2O_2$ is heated by heater 3 in evaporation container 2. By this heating, organic substances contained in the water to be treated decompose into organic acid, carbonic acid, carbonic acid gas and $H_2O$. The evaporated vapor is cooled at cooler 4 to be distilled water, is passed through distilled water output tube 5 and introduced into polisher 8. The low boiling point organic substance remaining in the distilled water as an impurity at the time of distillation in the conventional apparatus is effectively absorbed by ion-exchange resin in polisher 8, because the substance is converted into organic acid, carbonic acid, and water in the apparatus according to the embodiment. Therefore, the resultant ultrapure water output from ultrapure water supply tube 9 has a quality very close to logical ultrapure water. FIG. 3A shows an improved version of Embodiment 3. Ultraviolet irradiator 6 is disposed in evaporation container 2. Such an arrangement promotes decomposition of organic substances included in water to be treated into organic acid, carboxylic acid, carbon dioxide acid gas and $H_2O$.

Embodiment 4

Figure 4:
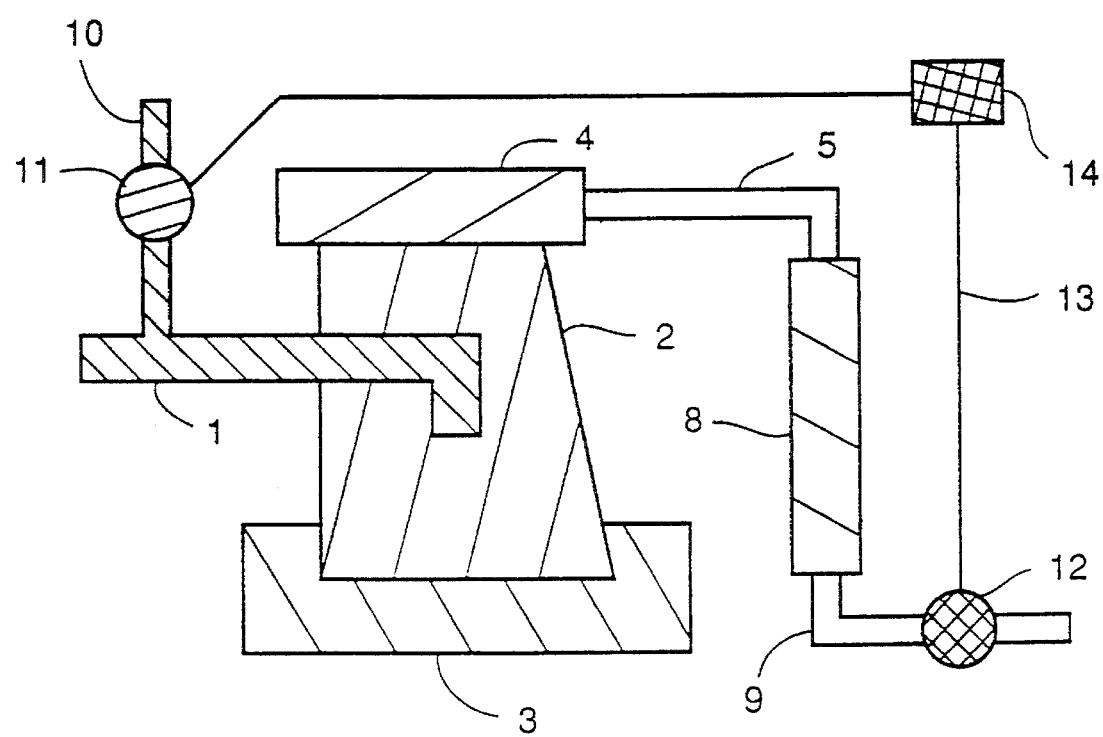
FIG. 4 is a view showing the concept of a ultrapure water manufacturing apparatus according to a fourth embodiment of the invention.

FIG. 4 is a view showing the concept of an apparatus for manufacturing ultrapure water according to a still further embodiment of the invention. Since the ultrapure water manufacturing apparatus shown in FIG. 4 is substantially identical to the apparatus shown in FIG. 3 with the following differences, corresponding portions are attached with the same reference numerals, and description thereof will not be repeated. In the apparatus shown in FIG. 4, an $H_2O_2$ injection tube 10 and a pump 11 for adjusting the amount of injecting $H_2O_2$ are provided. At a ultrapure water supply outlet 9, a TOC sensor 12 is connected to pump 11 with a controller 14 therebetween. The concentration of TOC (Total Organic Carbon) of water to be treated supplied to water injection tube 1 usually fluctuates depending upon time and places. Accordingly, the optimum amount of $H_2O_2$ for injection fluctuates as well. In order to produce the optimum value, TOC sensor 12 is provided at ultrapure water supply tube 9, a signal indicating a TOC concentration is sent to controller 14 by a line 13 for processing the data. Then, controller 14 transmits data to adjusting pump 11 and controls the amount of injecting $H_2O_2$. The provision of this feedback system restrains TOC in ultrapure water to be supplied as much as possible, the amount of injecting $H_2O_2$ can be controlled so that it is not injected excessively, and the amount of agent can be reduced. It is noted that such a feedback system can be applied to the embodiment shown in FIG. 1 and other embodiments.

Embodiment 5

Figure 5A:
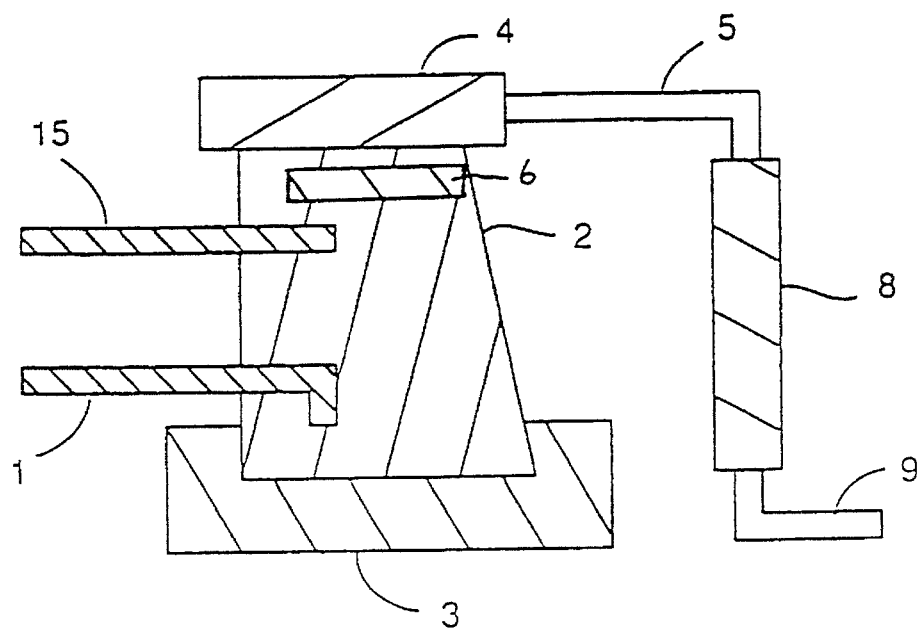
FIG. 5A is a view showing an improved version of the embodiment depicted in FIG. 5.
Figure 5:
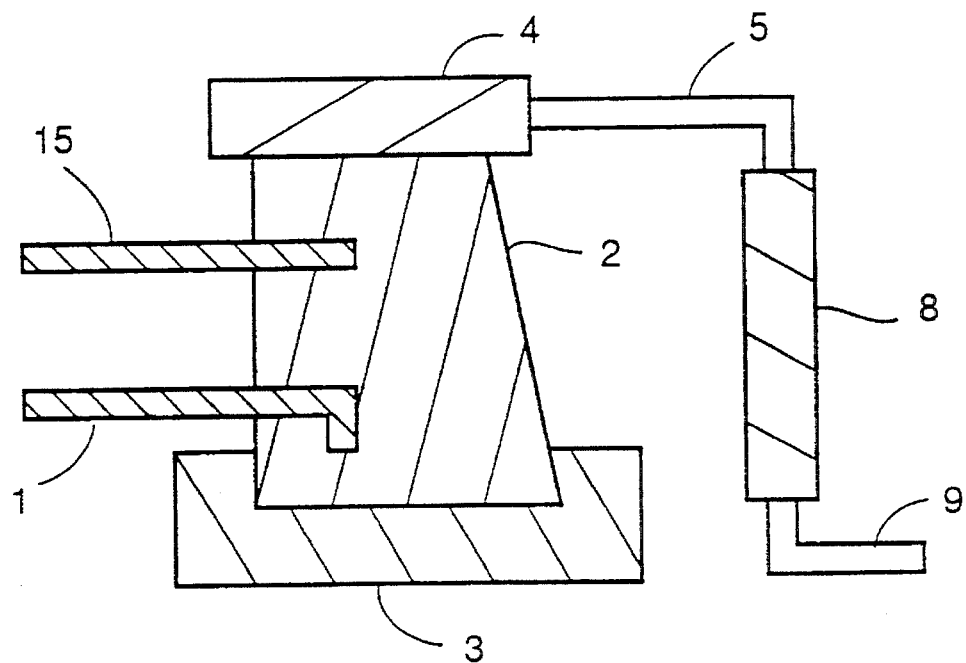
FIG. 5 is a view showing the concept of a ultrapure water manufacturing apparatus according to a fifth embodiment of the invention.

FIG. 5 is a view showing the concept of an apparatus for manufacturing ultrapure water according to a still further embodiment of the invention. The apparatus shown in FIG. 5 is substantially identical to the apparatus shown in FIG. 3 with the following differences, therefore the same portions are attached with the same reference numerals, and description thereof will not be repeated here.

In the apparatus shown in FIG. 5, an $O_2/O_3/O$-radical injection tube 15 is provided for supplying $O_2$, $O_3$ or O-radicals into the space of an evaporation container 2. It is noted that O-radical can be obtained by injecting $O_2$ into a discharge tube. Water to be treated accommodated in evaporation container 2 is heated by a heater 3 and evaporates. At that time, the vapor reacts with $O_2$, $O_3$, or O-radicals, and then a TOC component in the distilled water decomposes by oxidation to be organic acid, carbonic acid and water. The vapor is cooled at a cooler 4 to be distilled water. The produced distilled water is passed through a distilled water output tube 5 and sent to a polisher 8. The TOC which has become ions by oxidation decomposition in evaporation container 2 is removed away by ion-exchange resin filling polisher 8. Since non-volatile impurity remains at the bottom of evaporation container 2, clean ultrapure water is provided from ultrapure water supply tube 9.

FIG. 5A shows an improved version of Embodiment 5. Ultraviolet irradiator 6 is disposed in evaporation container 2. Such an arrangement promotes oxidation and decomposition of TOC component in the distilled water.

Embodiment 6

Figure 6:
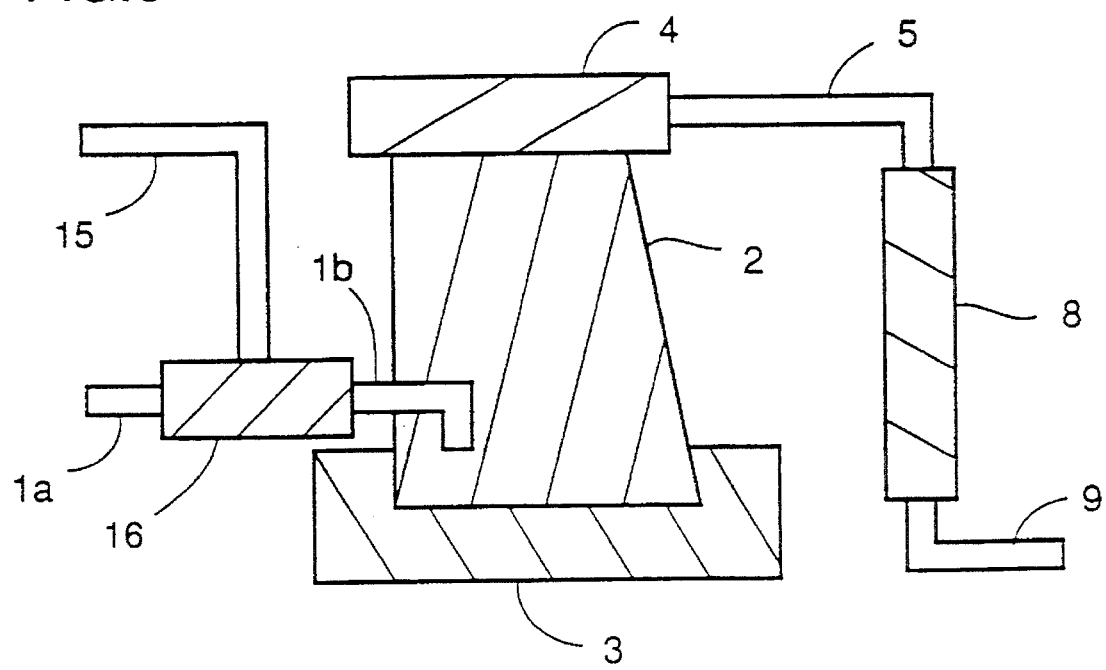
FIG. 6 is a view showing the concept of a ultrapure water manufacturing apparatus according to a sixth embodiment of the invention.

FIG. 6 is a view showing the concept of an apparatus for manufacturing ultrapure water according to an additional embodiment of the invention. Since the apparatus shown in FIG. 6 is substantially identical to the apparatus shown in FIG. 3 with the following differences, the same portions are provided with the same reference numerals and description thereof will not be repeated here. An ejector 16 is connected to evaporation container 2 by a water injection tube 1b. Ejector 16 is supplied with primary pure water to be treated through water injection tube 1a. Ejector 16 is also connected to an $O_2/O_3/O$-radical injection tube 15. The water to be treated entered from a water injection tube 1a is mixed with $O_2$, $O_3$, or O-radicals supplied from $O_2/O_3/O$-radical injection tube 15. At that time, part of TOC decomposes by oxidation and becomes organic acid, carbonic acid and water. The water to be treated introduced into evaporation container 2 is distilled by heating, and non-volatile impurity is removed from the water to be treated. At the same time, since the temperature is increased, oxidation decomposition of non-volatile impurity in the water to be treated is promoted as well. More specifically, the non-volatile impurity is changed into organic acid, carbonic acid, and water by the oxidation decomposition. The evaporated vapor is cooled at a cooler 4 and becomes distilled water. The distilled water is passed through a distilled water output tube 5 and sent to polisher 8. The TOC which has become ions by the oxidation decomposition in evaporation container 2 is removed by ion-exchange resin filling polisher 8 or a reverse osmosis membrane. Since the non-volatile impurity remains at the bottom of evaporation container 2, the resultant ultrapure water output from ultrapure water supply tube 9 attains a quality close to logical ultrapure water.

Embodiment 7

Figure 7:
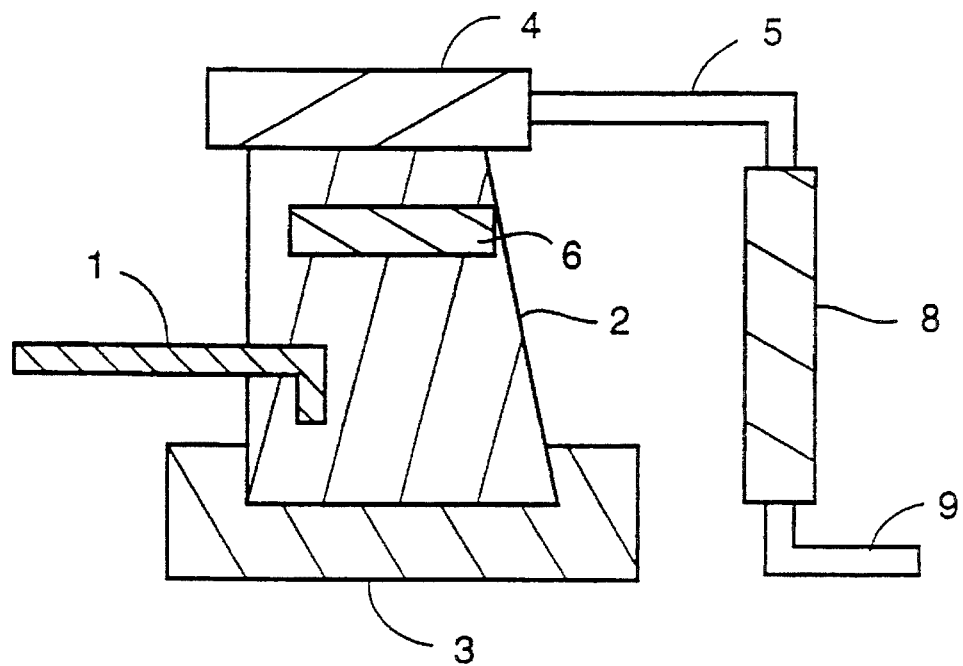
FIG. 7 is a view showing the concept of a ultrapure water manufacturing apparatus according to a seventh embodiment of the invention.
Figure 8:
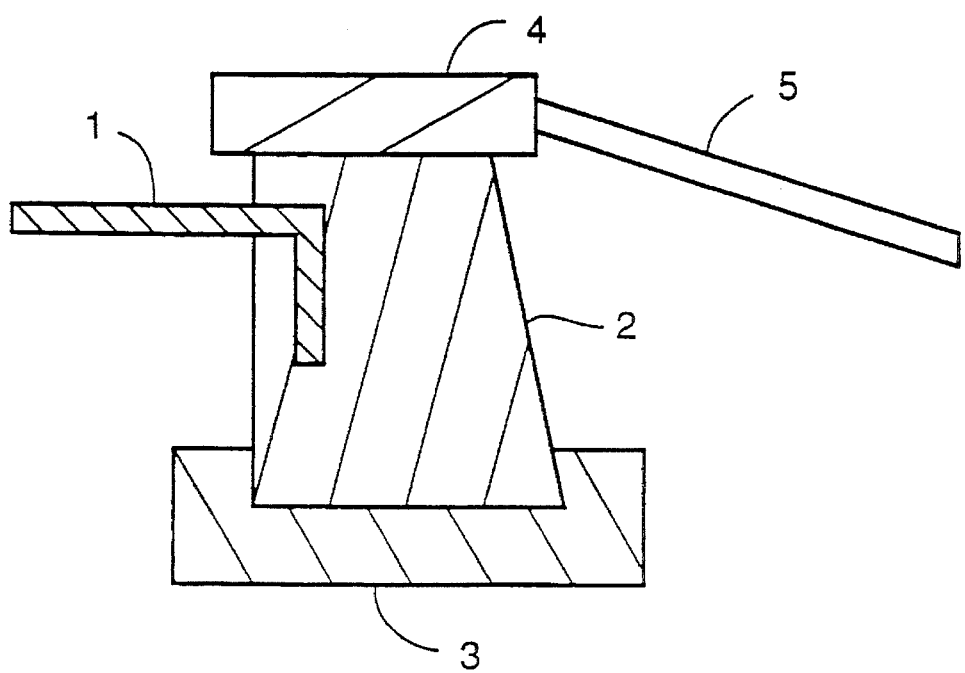
FIG. 8 is a view showing the concept of a conventional ultrapure water manufacturing apparatus.

FIG. 7 is a view showing the concept of an apparatus for manufacturing ultrapure water according to an additional embodiment of the invention.

Since the apparatus shown in FIG. 7 is substantially identical to the apparatus shown in FIG. 1 with the following differences, the same portions are attached with the same reference numerals, and description thereof will not be repeated here.

In this embodiment, a ultraviolet light irradiator 6 is provided in an evaporation container 2. In this apparatus, water to be treated in evaporation container 2 is irradiated with ultraviolet light when it is being boiled with its temperature increased. Accordingly, oxidation decomposition of low boiling point non-volatile impurity is performed at the ascending temperature, and therefore the efficiency of oxidation decomposition is improved. Also in this embodiment, since ultraviolet light irradiator 6 is built in evaporation container 2, the size of the pure water manufacturing apparatus can be reduced.

As in the foregoing, in the method of manufacturing ultrapure water according to the invention, low boiling point impurity is removed together with high boiling point impurity, and therefore ultrapure water having a quality close to logical ultrapure water can be provided.

Furthermore, in the ultrapure water manufacturing apparatus according to the invention, low boiling point impurity can be removed together with high boiling impurity, and therefore ultrapure water having a quality close to the logical pure water can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for manufacturing ultrapure water, comprising:

a container for accommodating water to be treated and evaporating the water to be treated;

water to be treated supplying means attached to said container for supplying the water to be treated into the container;

heating means for heating said water to be treated in said container and evaporating the water to be treated;

cooling means for cooling vapor of said water to be treated evaporated from the inside of said container and changing the vapor into distilled water;

means for conveying said distilled water from said cooling means directly to an ultraviolet irradiator;

ultraviolet light irradiation means associated with said ultraviolet irradiator for irradiating said distilled water with ultraviolet light, thereby decomposing an organic impurity contained in the distilled water; and means for removing organic decomposed substances contained in said distilled water irradiated with the ultraviolet light.

2. An apparatus for manufacturing ultrapure water, comprising:

a container for accommodating water to be treated and evaporating the water to be treated;

water to be treated supplying means attached to said container for supplying the water to be treated into said container;

oxidizing agent introduction means for introducing an oxidizing agent into said water to be treated;

heating means for heating said water to be treated in said container, thereby evaporating the water to be treated;

cooling means for cooling vapor of said water to be treated evaporated from the inside of said container, thereby changing the vapor into distilled water; and means for removing organic decomposed substances contained in said distilled water.

3. An apparatus as recited in claim 2, wherein said oxidizing agent introduction means is attached to said water to be treated supplying means.

4. An apparatus as recited in claim 2, wherein said oxidizing agent is selected from the group consisting of $H_2O_2$, $O_2$, $O_3$, and O-radicals.

5. An apparatus for manufacturing ultrapure water, comprising:

a container for accommodating water to be treated and evaporating the water to be treated;

water to be treated supplying means attached to said container for supplying the water to be treated into said container;

oxidizing agent introduction means for introducing an oxidizing agent into said water to be treated;

heating means for heating said water to be treated in said container, thereby evaporating the water to be treated;

cooling means for cooling vapor of said water to be treated evaporated from the inside of said container, thereby changing the vapor into distilled water;

means for removing organic decomposed substances contained in said distilled water; and ultraviolet light irradiation means provided in said container for irradiating the water to be treated accommodated in said container with ultraviolet light of sufficient power to decompose organic impurities in said water.

6. An apparatus for manufacturing ultrapure water, comprising:

a container for accommodating water to be treated and evaporating the water to be treated;

water to be treated supplying means attached to said container for supplying the water to be treated into the container;

oxidative gas supplying means attached to said container for supplying $O_2$, $O_3$ or O-radicals into a space in said container which is not filled with said water to be treated;

heating means heating said water to be treated in said container, thereby evaporating the water to be treated;

cooling means for cooling vapor of said water to be treated evaporated from the inside of said container, thereby changing the vapor into distilled water;

means for removing organic decomposed substances contained in said distilled water; and ultraviolet light irradiation means provided in said container for irradiating the water to be treated accommodated in the container with ultraviolet light of sufficient power to decompose impurities in said water.

* * * * *